United States Patent

[11] 3,548,851

| [72] | Inventor | Robert W. Sampson |
| | | Arlington Heights, Ill. |
| [21] | Appl. No. | 717,100 |
| [22] | Filed | Mar. 29, 1968 |
| [45] | Patented | Dec. 22, 1970 |
| [73] | Assignee | Universal Oil Products Company |
| | | Des Plaines, Ill. |
| | | a corporation of Delaware |

[54] FLOW CONTROL DEVICE
1 Claim, 1 Drawing Fig.

| [52] | U.S. Cl. | 137/81.5 |
| [51] | Int. Cl. | F15c 1/20 |
| [50] | Field of Search | 137/81.5 |

[56] References Cited
UNITED STATES PATENTS

| 3,272,215 | 9/1966 | Bjornsen et al. | 137/81.5 |
| 3,285,263 | 11/1966 | Bjornsen et al. | 137/81.5 |
| 3,295,543 | 1/1967 | Zalmanzon | 137/81.5 |
| 3,367,350 | 2/1968 | Howland | 137/81.5 |
| 3,413,994 | 12/1968 | Sowers III | 137/81.5 |
| 3,366,370 | 1/1968 | Rupert | 137/81.5 |
| 3,456,667 | 7/1969 | Mayer | 137/81.5 |
| 3,472,255 | 10/1969 | Fox et al. | 137/81.5 |

Primary Examiner—Samuel Scott
Attorney—James R. Hoatson, Jr. and Joseph C. Mason, Jr.

ABSTRACT: Flow control device which operates without moving parts. The device utilizes opposing flows of fluid to control the main stream flow. It is particularly useful in gaseous streams operating at relatively low flow rates. It finds particular utility in environments which tend to plug conventional moving part valve devices.

PATENTED DEC 22 1970          3,548,851
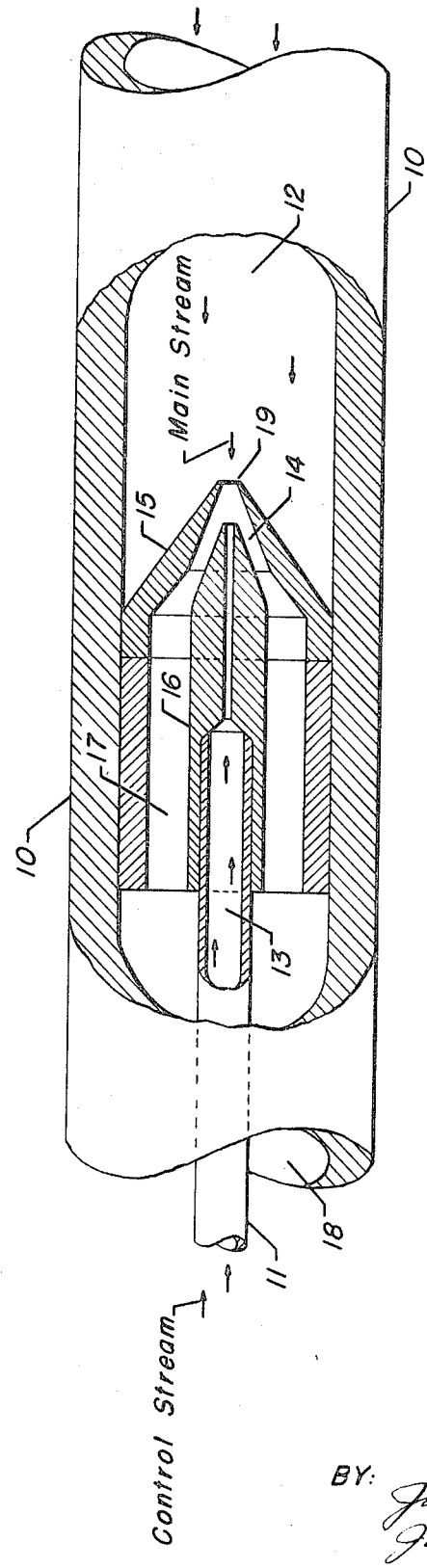
INVENTOR:
Robert W. Sampson
BY:
James R. Hoatson, Jr.
Joseph E. Mason, Jr.
ATTORNEYS

FLOW CONTROL DEVICE

BACKGROUND OF THE INVENTION

The present invention relates to a fluid control device. It particularly relates to a flow control device which operates without moving parts.

The chemical process industries have long been in need of a nonclogging valve arrangement for use in handling fluids which tend to plug conventional moving part devices. Heretofore, gate and needle valve devices have been the standard apparatus for controlling the flow of various types of fluids, both liquid and gaseous. However, as those skilled in the art are aware, these prior art valve devices are impractical for use with dirty streams, such as those containing entrained particulate matter. Perhaps the biggest disadvantage in the use of the prior art gate or needle devices has been the inability of such devices to maintain a constant low volume flow through the high constricted orifices without cessation or substantial variation of flow. Obviously, it would be desirable to have an apparatus for controlling the flow of fluid which would improve upon the prior art devices in such a manner as to provide constant and even flow control under widely varying rates of flow sought to be controlled.

SUMMARY OF THE INVENTION

Accordingly, it is an object of this invention to provide a control system.

It is another object of this invention to provide improved apparatus for controlling the flow of fluid.

It is still another object of this invention to provide an economical and facile nonclogging valve.

Therefore, apparatus of the present invention for controlling the flow of fluid comprises in combination a conduit for carrying a main stream of fluid, said conduit having located therein (a) orifice type restrictive means, and (b) inlet means downstream of the restrictive means, said inlet means comprising nozzle means facing in substantially axial alignment to and spaced from said orifice opening in the restrictive means.

A particular apparatus of this invention includes the broad apparatus hereinabove wherein said restrictive means comprises tapered orifice device forming a nozzle which faces against the flow of said main stream and wherein said inlet means is inserted to in concentric relationship to the restrictive means nozzle to thereby form an annulus between said nozzles for passage of fluid therethrough.

A specific embodiment of this invention includes nonclogging valve means comprising in combination elongated housing means having internally placed open frustoconical section in the transverse direction, inlet conduit means having nozzle means terminating in the interior of said section, said nozzle facing in substantial axial alignment to and spaced from the opening in said section and inlet and outlet means for fluid at the ends of said housing.

DETAILED DESCRIPTION OF THE INVENTION

It can be seen from the above embodiments that the essence of the present invention includes the use of opposing flows of fluid to control the main flow of fluid. In other words, the present invention is predicated on the concept that a control fluid be introduced through a nozzle against the flow of the main body of fluid also through an orifice or nozzle means. Thus, when the pressure in the main stream is equal to the control stream pressure, the control stream begins to reverse flow direction. At this point, the net main stream flow forward plus control stream passes through the annulus created where the remaining pressure drop for control purposes is taken. Thus, it can be seen that there are no moving parts involved and no valve seats to clean as is the conventional situation with prior art devices.

The apparatus of the present invention may be used in any environment being limited only by materials of construction and/or physical properties of the main stream of fluid. For example, the main stream may be liquid and the control stream my may be liquid; the main stream may be gaseous and the control stream gaseous; the main stream may be liquid and the control stream may be gaseous; etc. The control stream may be similar in composition to the main stream or may be entirely different. Those skilled in the art from the teachings presented herein will be able to determine the particular application for which this invention will be most beneficial.

A specific illustration of the utility of the apparatus of this invention would be the pressure control on the flue gas from a combustion chamber. For this application, the apparatus would be a pressure control valve that is operated directly with control air from a transducer.

The invention may be more fully understood with reference to the accompanying drawing which is a schematic representation of one embodiment of the inventive control apparatus.

DESCRIPTION OF THE DRAWING

Now referring to the drawing, a main stream of process gas, such as the flue gas from a combustion chamber, is introduced into conduit 10 via line 12. Orifice restrictive means 15 is placed internally of conduit 10 and tapered in the direction against the flow of the main stream. The tapered area does not close, but forms opening 19 which provides a restrictive means for the passage of the main stream therethrough.

Concentrically located within the conical area of restrictive means 15 is second conduit 11 having nozzle means 16 facing in substantial axial alignment to and spaced from opening 19 in restrictive means 15. The space 14 is sufficiently large to allow mixing of the main stream flow and the control stream which in the present illustration is air which is introduced through conduit 11 via lie line 13.

As the pressure of the control stream in conduit 11 becomes equal to the pressure of the main stream which is passing via line 12, the net flow of main stream gas and control gas passes through annulus 17 and out of the system via the downstream side of conduit 11 shown in the drawing as area 18.

The angle at which restrictive device 15 faces the main stream flow is not critical. In fact, restrictive means 15 can be a vertical orifice plate placed in the transverse direction having single opening 19. Additionally, restrictive means 15 can also include a venturi type constriction which forms restrictive opening 19 between the two relatively large inlets and outlets of such arrangement as is well known to those skilled in the art.

However, in any event, the precise control of the flow of the main stream is determined by the degree of pressure drop through orifice opening 19, through the back pressure of the control stream in 13, and the pressure drop of the annulus restriction 17.

Also included within the concept of the present invention is a restrictive device 15 having a plurality of orifice holes and which incorporates a similar number of inlet conduit nozzles 16 placed in proper relationship to the orifice openings according to the teachings presented herein.

I claim:

1. In an apparatus for controlling the flow of fluid, the combination comprising a conduit for carrying a main stream of fluid, a tapered frustoconical orifice restriction means having an axial passageway positioned in a direction against the flow of said main stream, a second control stream conduit mounted concentrically within the conical area of said orifice restriction means and positioned interiorly thereof to provide an annular fluid outlet passageway therebetween, said annular outlet passageway extending over a substantial portion of the length of said orifice restriction means, said control stream conduit terminating downstream of said orifice restriction means with respect to said main stream, whereby when fluid pressure in said main stream exceeds fluid pressure in said control stream, the net main stream and control stream flow passes through said annular fluid passageway.